United States Patent
Kitada et al.

[11] Patent Number: 5,637,631
[45] Date of Patent: Jun. 10, 1997

[54] PREPARATION PROCESS OF DEGRADABLE POLYMER

[75] Inventors: Ikumi Kitada; Chojiro Higuchi; Masanobu Ajioka; Akihiro Yamaguchi, all of Kanagawa-ken, Japan

[73] Assignee: Mitsui Toatsu Chemicals, Inc., Tokyo, Japan

[21] Appl. No.: 553,984

[22] Filed: Nov. 6, 1995

[30] Foreign Application Priority Data

Nov. 17, 1994 [JP] Japan ................................. 6-283614
Mar. 24, 1995 [JP] Japan ................................. 7-065656

[51] Int. Cl.$^6$ .......................... C08K 5/00; C08F 20/00
[52] U.S. Cl. .................. 524/81; 528/272; 528/274; 528/275; 528/354; 528/361; 528/482; 528/487; 528/488; 525/444; 525/450; 524/155; 524/356; 524/366
[58] Field of Search ....................... 528/272, 274, 528/275, 354, 482, 361, 487, 488; 525/444, 450; 524/81, 155, 356, 366

[56] References Cited

U.S. PATENT DOCUMENTS

| | | | |
|---|---|---|---|
| 3,636,956 | 1/1972 | Schneider | 128/335.5 |
| 3,736,646 | 6/1973 | Schmitt et al. | 29/458 |
| 3,797,499 | 3/1974 | Schneider | 128/334 R |
| 3,982,543 | 9/1976 | Schmitt et al. | 128/335.5 |
| 4,057,537 | 11/1977 | Sinclair | 528/354 |
| 5,403,897 | 4/1995 | Ebato et al. | 525/444 |

FOREIGN PATENT DOCUMENTS

| | | |
|---|---|---|
| 572675 | 12/1993 | European Pat. Off. . |
| 618250 | 10/1994 | European Pat. Off. . |
| 618249 | 10/1994 | European Pat. Off. . |
| 1533082 | 7/1968 | France . |
| 4300420 | 7/1994 | Germany . |
| 7-173266 | 7/1995 | Japan . |

*Primary Examiner*—Samuel A. Acquah
*Attorney, Agent, or Firm*—Burns, Doane, Swecker & Mathis

[57] ABSTRACT

A process for preparing a degradable copolymer of aliphatic polyester comprising the steps of reacting two or more kinds of aliphatic polyester homopolymer in the presence of a catalyst in a reaction mixture containing an organic solvent, and a degradable copolymer of aliphatic polyester obtained by said preparation process. The copolymers exhibits high transparency in addition to excellent strength and elongation, can be processed into various molded articles and formed items such as films and filaments, and can provide heat resistance by heat treatment of said molded articles and formed items. The copolymer can be suitably utilized for processed articles such as a film, breathable film, sheet, textile, monofilament, multifilament, yarn, nonwoven fabric, flat yarn, staple, crimped fiber, ribbed tape, split yarn, conjugate fiber, laminate, blow-bottle, sheet, stretched sheet, foam and net.

14 Claims, No Drawings

1

PREPARATION PROCESS OF DEGRADABLE POLYMER

BACKGROUND OF THE INVENTION

1. Field of the Invention

The present invention relates to a preparation process of a degradable copolymer of aliphatic polyester useful for medical materials and substitutes of general purpose resins.

More specifically, the invention relates to a process for preparing a degradable compolymer of aliphatic polyester compounds which is obtained by reacting two or more homopolymers of the aliphatic polyester compounds in the presence of a catalyst in a reaction mixture containing an organic solvent; and a degradable copolymer of aliphatic polyester prepared by said preparation process.

The degradable copolymer of aliphatic polyester which can be prepared by the process of the invention is very excellent, as compared with homopolymers, in heat resistance, transparency, elongation, flexibility, plasticity and shaping ability, and can be processed into medical materials and substitutes for general purpose resins in the form of a molded article, film, sheet, filament, yarn and foam having strength, elongation, transparency and heat resistance which satisfy the object.

2. Description of Related Art

The polymer of aliphatic polyester is characterized by hydrolyzing with ease in the presence of water and waste articles can degrade without contaminating the environment when the polymer is used as a general purpose resin. Consequently, the polymer has already received attention as an environmentally friendly substitute for general purpose resins prior to the application of the invention. Further, in the case of using the polymer in a living body as a medical material, the polymer can be decomposed and absorbed in the living body after accomplishing the object without giving toxicity to the living body. Thus, the polymer has received attention before the present application as a medical material which is friendly for the living body.

In many cases, however, an aliphatic polyester homopolymer alone cannot fully satisfy the desired properties as a medical material or a substitute for general purpose resins.

For example, polylactic acid is brittle, hard and lacking in flexibility. These properties have led to problems when the polymer is processed into films, filaments and molded articles. That is, conventional technology could not provide with ease aliphatic polyester having softness, flexibility, transparency and high heat resistance.

U.S. Pat. Nos. 3,736,646 and 3,982,543 have disclosed the use of a volatile solvent as a plasticizer in order to provide flexibility for a lactide copolymer. However, when the polymer is processed into film or molded articles and used for preservation of products, food containers or medical devices, gradual evaporation of the solvent eliminates the plasticizing effect and causes problems on the quality retention of the products. At the same time, the released solvent from the polymer is possible to give a toxic effect on the food or the living body which is in contact with the polymer and has problems in view of safety insurance.

U.S. Pat. Nos. 3,636,956 and 3,797,499 have disclosed an L-lactide/D,L-lactide copolymer which can be used for a surgical suture. The patent has also described that plasticizers such as glycerol triacetate, ethyl benzoate and diethyl phthalate are added, in order to provide plasticity, to the copolymer which lacks plasticity. When no plasticizer is added to the copolymer, it is a problem that the copolymer has a low elongation at break of only about 10%. On the other hand, when these plasticizers are added to the copolymer, it is naturally anticipated that food packaging containers and medical devices eluate these plasticizers upon use and give a toxic effect on the living body, or the plasticizers eluated from abandoned articles contaminate the natural environment.

Polylactic acid and other polymers having a high brittleness, high hardness and low flexibility have been mixed with other polymers having a high ductility or plasticity, high softness and high flexibility to improve their physical properties. However, compatibility between homopolymers of different kind is generally low. Thus, it is extremely difficult to obtain a polymer alloy having improved properties by mixing two or more homopolymers of different kind in the absence of a compatibilizer. For example, when the compatibility between homopolymers is low even though two homopolymers individually have transparency, it is difficult to obtain the polymer alloy having improved properties while maintaining transparency.

U.S. Pat. No. 4,057,537 has disclosed a non-rubber-like copolymer having impact resistance, brittleness resistance and heat resistance which is obtained by heating an L-lactide/ε-caprolactone mixture containing 75 to 90% of L-lactide at a temperature between the melting point of L-lactide and 200° C. in the presence of a catalyst. The patent has also described that a copolymer containing 15% or more of ε-caprolactone is soft and transparent. These copolymers, however, have disadvantages of low or no crystallinity and low heat resistance.

Japanese Laid-Open Patent HEI 7-173266 has disclosed a preparation process of a linear lactic acid type copolyester by subjecting lactide, that is, the cyclic dimer of lactic acid and linear aliphatic polyester consisting of an aliphatic dicarboxylic acid ingredient and an aliphatic diol ingredient to a ring-opening polymerization and ester exchange reaction in the presence of a ring-opening polymerization catalyst.

SUMMARY OF THE INVENTION

The present inventors have carried out an intensive investigation in order to improve the properties of a homopolymer which are difficult to fully satisfy the requirement as a substitute for general purpose resins or a medical material. As a result, they have found that a copolymer can be obtained with ease by reacting two or more kinds of aliphatic polyester homopolymer in the presence of a catalyst in a reaction mixture containing an organic solvent, and that the copolymer thus obtained has a highly blocked structure and can satisfy the required properties. Thus, the present invention has been completed.

That is, the aspect of the invention is a process for preparing a degradable copolymer of aliphatic polyester comprising reacting two or more kinds of an aliphatic polyester homopolymer in the presence of a catalyst in a reaction mixture containing an organic solvent, and a degradable copolymer of aliphatic polyester which is prepared by said process.

DETAILED DESCRIPTION OF THE INVENTION

The homopolymer of aliphatic polyester which can be used as a raw material in the invention is polyhydroxycarboxylic acid prepared from one or more kinds of hydroxycarboxylic acid such as lactic acid, glycolic acid, 3-hydroxybutyric acid, 2-hydroxybutyric acid, 3-hydroxyvaleric acid, 5-hydroxyvaleric acid and 6-hydroxycaproic acid, and aliphatic polyester obtained by reacting polyhydric alcohol such as ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethyleneglycol, 1,4-cyclohexanedimethanol and 1,4-benzenedimethanol, with polybasic acid such as succinic acid, oxalic acid, malonic acid, glutaric acid, adipic acid, pimelic acid, suberic acid, azelaic acid, sebacic acid, undecanoic diacid, dodecanoic diacid, phenylsuccinic acid and 1,4-phenylenediacetic acid.

The two or more kinds of the aliphatic polyester homopolymer used in the preparation process of the invention can be a combination of polyhydroxycarboxylic acid and aliphatic polyester prepared from polyhydric alcohol and polybasic acid, or a combination of two or more kinds of polyhydroxycarboxylic acid alone. Polylactic acid is particularly preferred in view of strength and transparency. Polycaprolactone, that is the polymer of 6-hydroxycaproic acid, and polybutylene succinate, that is the polymer obtained from 1,4-butanediol and succinic acid are particularly preferred in view of elongation and flexibility.

Each homopolymer of aliphatic polyester which can be used in the preparation process of the invention has an weight average molecular weight of preferably 10,000 or more respectively. The weight average molecular weight less than 10,000 decreases crystallinity of the polymer obtained and reduces the below described effect of heat treatment on improving heat resistance.

The content of each homopolymer in the copolymer can be suitably selected depending upon the combination of each homopolymer and the desired properties. For example, when polylactic acid and polybutylene succinate are used as the raw material homopolymer, the proportion of polybutylene succinate unit in the copolymer is preferable in the range of 11 to 51% by weight. When the proportion is too low, satisfactory softness, ductility or plasticity, and flexibility cannot be obtained. On the other hand, too high a content unfavorably lowers transparency. The range of 21 to 37% by weight is more preferred and a copolymer having high flexibility and transparency can be obtained in the range. When polylactic acid and polycaprolactone are used as the raw material homopolymer, the proportion of polycaprolactone unit in the copolymer is preferably in the range of 5 to 35% by weight. Too low a proportion cannot provide satisfactory softness, ductility or plasticity, and flexibility. On the other hand, too high a proportion leads to lack of heat resistance.

Exemplary solvents which can be used for preparing aliphatic polyester copolymer of the invention include for example, toluene, xylene, mesitylene and other hydrocarbon solvents; chlorobenzene, bromobenzene, iodobenzene, dichlorobenzene, 1,1,2,2-tetrachloroethane, p-chlorotoluene and other halogenated hydrocarbon solvents; 3-hexanone, acetophenone, benzophenone and other ketone solvents; dibutyl ether, anisole, phenetol, o-dimethoxybenzene, p-dimethoxybenzene, 3-methoxytoluene, dibenzyl ether, benzyl phenyl ether, methoxynaphthalene and other ether solvents; diphenyl sulfide, thioanisole and other thioether solvents; methyl benzoate, dimethyl phthalate, diethyl phthalate and other ester solvents diphenyl ether, 4-methyldiphenyl ether, bis(3-methylphenyl) ether, 3-phenoxytoluene and other alkyl substituted diphenyl ether solvents; 4-bromodiphenyl ether, 4-chlorodiphenyl ether, 4-methyl-4'-bromodiphenyl ether and other halogen substituted diphenyl ether solvents; 4-methoxydiphenyl ether, bis(4-methoxyphenyl)ether, bis(3-methoxyphenyl)ether, 4-methyl-4'-methoxydiphenyl ether and other alkoxy substituted diphenyl ether solvents; and dibenzofuran, xanthene and other cyclic diphenyl ether solvents. These solvents can be used singly or as a mixture.

The solvent of the invention preferably has a higher boiling point, more preferably has a boiling point higher than 180° C. Dehydration reaction can efficiently progress without accompanying unfavorable side reactions by carrying out the reaction at decreased temperature under reduced pressure.

As described below in the preparation process of the invention the reaction is preferably carried out while removing water which is formed in the reaction. Accordingly preferred solvents can separate water with ease by partitioning means such as separation and distillation. Particularly in order to obtain a high molecular weight copolymer, ether solvents, alkylaryl ether solvents and diphenyl ether solvents are more preferred, and alkylaryl ether solvents and diphenyl ether solvents are most preferred. The amount of these solvents is preferably in the range of 10 to 80% which is converted to polymer concentration obtained.

No restriction is imposed upon the solvent on whether or not form azeotrope with or separate from water.

The catalysts which can be used in the invention are metals of the group II, III, IV and V in the periodic Table and oxides or salts thereof.

Exemplary catalysts include zinc powder, tin powder aluminum, magnesium and other metals; tin oxide, antimony oxide, zinc oxide, aluminum oxide, magnesium oxide, titanium oxide and other metal oxides; stannous chloride, stannic chloride, stannous bromide, stannic bromide, antimony fluoride, zinc chloride, magnesium chloride, aluminum chloride and other metal halogenides; tin sulfate, zinc sulfate, aluminum sulfate and other metal sulfates; magnesium carbonate, zinc carbonate and other metal carbonates; tin acetate, tin octoate, tin lactate, zinc acetate, aluminium acetate and other metal organic carboxylates; tin trifluoromethanesulfonate, zinc trifluoromethanesulfonate, magnesium trifluoromethanesulfonate, tin methansulfonate, tin p-toluenesulfonate and other metal organic sulfonates; dibutyltin oxide and other organic metal oxides of the above metals; titanium isopropoxide and other metal alkoxides of the above metals; diethyl zinc and other alkyl metal of the above metals. These catalysts can be used singly or as a mixture.

The amount of these catalysts is in the range of preferably 0.0001 to 5% by weight, more preferably 0.001 to 1% by weight in view of economy for the weight of the polymer to be obtained by using the catalyst.

The copolymer of the invention can be prepared by reacting two or more kinds of aliphatic polyester homopolymer in the presence of a catalyst in a reaction mixture containing an organic solvent. In order to obtain high molecular weight copolymers, it is required to protect the polymer from hydrolysis by water which is formed in the reaction and is dissolved in the organic solvent of the reaction system. Water content in the reaction mixture is preferably 50 ppm or less, more preferably 20 ppm or less, most preferably 5 ppm or less. Accordingly, the reaction is preferably carried out while removing at least a portion of the organic solvent and charging an organic solvent which has water less than the water content of the removed organic solvent to the reaction system as an additional solvent. Alternatively, a portion of the solvent can be taken out of the reaction system, dehydrated by treatment with a drying agent distillation, and successively returned again into the reaction system. Other embodiments include a process for previously charging the solvent in excess and conducting dehydration by merely distilling the solvent and a process for drying the reaction solvent by use of another solvent.

Exemplary drying agents which can be used in order to obtain a copolymer having a high weight average molecular weight in the invention include molecular sieve 3A, molecular sieve 4A, molecular sieve 5A, molecular sieve 13X and other molecular sieves, alumina; ion exchange resins; silica gel, calcium chloride, calcium sulfate, diphosphorus pentoxide, concentrated sulfuric acid, magnesium perchlorate, barium oxide, calcium oxide, potassium hydroxide, sodium hydroxide; calcium hydride, sodium hydride, lithium aluminum hydride and other metal hydrides; and sodium and other alkali metals. These drying agents can be used singly or as a mixture. In these drying agents, molecular sieves and ion exchange resins (particularly cation exchange resins) are preferred in view of handling and reactivation with ease.

The reaction temperature in the invention is determined in consideration of the forming velocity of the copolymer and the heat decomposition velocity of the formed copolymer and is in the range of preferably 90° to 200° C., more preferably 110° to 180° C. The reaction is usually carried out at the reflux temperature of the solvent. When a high boiling point solvent is used in order to carry out the reaction in a preferred range of temperature, the reaction can be carried out under reduced pressure. Reduction of boiling point due to formation of an azeotropic mixture between the solvent and water leads to no problem so long as the reaction is carried out at the prescribed temperature.

Preparation of the copolymer in the invention is preferably carried out under vacuum or in an atmosphere of inert gas such as nitrogen and argon so as to prevent penetration of moisture from outside of the reaction system while removing the moisture generated in the system. The reaction can also be carried out while ventilating or bubbling the inert gas.

The weight average molecular weight of the copolymer in the invention can be varied by changing the reaction conditions such as the molecular weight of the raw material homopolymer, kind of the solvent, kind and amount of the catalyst, reaction temperature, reaction time and treatment procedure of distilled solvent. When the copolymer is used in the form of a film, filament and other processed items, the weight average molecular weight is in the range of preferably 50,000 to 400,000, more preferably 100,000 to 400,000.

The reaction for preparing the copolymer of the invention can be carried out in a continuous operation or a batch operation. Dehydration and charge of the solvent can also be conducted continuously or batchwise.

After finishing the reaction, any known method can be used for the recovering of the desired copolymer from the reaction mixture. Exemplary recovering method of a formed copolymer includes an operating procedure for adding isopropyl alcohol to the reaction mixture and filtering and drying precipitated crystals.

The copolymer thus obtained in the invention is excellent in strength and elongation and simultaneously has a high transparency which cannot be provided by a random copolymer of aliphatic polyester or a mere blend consisting of two kinds of aliphatic polyester homopolymer. Further, the $^{13}$C-NMR spectrum of the copolymer in the invention does not exhibit a peak caused by ester exchange. As a result, it is assumed that the copolymer of the invention has a highly blocked structure and that a portionally formed copolymer by the preparation process of the invention acts as a compatibilizer, accelerates compatibilization of two kinds of aliphatic polyester homopolymer and provides transparency.

The present invention can provide a degradable copolymer having properties which cannot be satisfied by one kind of aliphatic polyester homopolymer.

The invention can also provide molded articles and formed items which utilize excellent properties of the degradable copolymer of the invention. For example, according to the present invention, the degradable copolymer prepared from polylactic acid and polycaprolactone or polylactic acid and polybutylene succinate can provide a film having a very large elongation which cannot be obtained by a polylactic acid film and an extremely high transparency which cannot be obtained by a polycaprolactone film or a polybutylene succinate film.

Further, heat treatment and/or stretching of the film prepared from the degradable copolymer of the invention can provide, in addition to transparency and flexibility, markedly high heat resistance which cannot be obtained by a heat-treated film of polylactic acid, polycaprolactone or polybutylene succinate film.

The degradable copolymer of the invention is suited for processing such as injection molding, extrusion forming, calendering, blow molding, balloon forming, blow forming and vacuum forming.

The degradable copolymer of the invention can be favorably utilized for processed articles such as a film, breathable film, sheet, textile, monofilament, multifilament, yarn, nonwoven fabric, flat yarn, staple, crimped fiber, parallel fiber, ribbed tape, split yarn, conjugate fiber, laminate, blow bottle, sheet, stretched sheet, foam and net. In the processing, additives such as lubricant, colorant, other polymer, demolding agent, filler and reinforcement can be used, when needed.

The degradable copolymer of the invention has an excellent biodegradability which can completely decompose in a living body or soil, and thus is very useful as a safe high polymer for the living body and natural environment.

Consequently, the degradable compolymer of the invention is greatly expected for uses such as a surgical suture, shopping bag, garbage bag, agricultural film, cosmetic container, detergent container, bleaching agent container, fishing line, fishing net, rope, tying material, suture, sanitary cover, stock material, low-temperature box and cushioning material. Particularly, the copolymer has high performance without addition of plasticizer and is very suitable for use in food packaging materials and medical devices.

EXAMPLE

Evaluation methods used in those examples are as follows.

Weight average molecular weight: Weight average molecular weight (Mw) of aliphatic polyester homopolymers and copolymers were measured by gel permeation chromatography at a column temperature of 40° C. in a chloroform solvent by comparing with a polystyrene standard sample.

Water content in a solvent: Measured such a Karl Fischer's moisture meter MKC-210 (manufactured by Kyoto Denki Kogyo Co.)

Differential thermal analysis: Analyzed with a scanning calorimeter DSC-3100 (Manufactured by Mac. Science Co.) in a temperature range of −20° to 230° C.

Tensile strength: Tensile strength of a film specimen was measured in accordance with JIS K-6732.

Elongation: Elongation of a film specimen was measured in accordance with JIS K-6732.

Transparency: Transparency was shown by Haze. Haze was measured with a Haze meter TC-HIII (manufactured by Tokyo Denshoku Co.) in accordance with JIS K-6714

Heat Resistance: A film having dimensions of 3 cm×1 cm was hung down with a dead weight of 20 g and heated at 120° C. for 10 minutes. Elongation after heating was measured. A film having a high heat resistance showed almost no elongation. A film having a low heat resistance was lengthened and deformed by heating.

EXAMPLE 1

(1) Reaction

To a reaction vessel, 63.9 g (0.90 mole) of poly-L-lactic acid having a weight average molecular weight of 148,000, 17.2 g (0.10 mole) of polybutylene succinate having a weight average molecular weight of 141,000, 0.41 g tin powder and 324.7 g of diphenyl ether having a water content of 10 ppm or less were charged. A tube was packed with 28 g of molecular sieve 3A and 69.6 g of diphenyl ether having a water content of 10 ppm or less and mounted on the reaction vessel so as to return the solvent which was distilled by reflux to the reaction system after passing through the molecular sieve. The reaction was carried out at 150° C. with stirring for 20 hours under reduced pressure of 40 mmHg while protecting the reaction system from contamination by water. The solvent after passing through the molecular sieve had a water content of 2 ppm.

To the reaction mixture, 800 ml of 0.7% hydrochloric acid/isopropyl alcohol solution was added, stirred for an hour and filtered under suction. Such procedure was carried out twice to remove tin powder.

Filter cake was stirred in 600 ml of isopropyl alcohol and filtered under suction. Such procedure was repeated until the filtrate became neutral. Successively the filter cake was washed with hexane and air dried at 60° C. to obtain 62.9 g (78% yield) of the copolymer having a weight average molecular weight of 135,000.

The copolymer had a glass transition temperature of 21.9° C. and two melting points of 113.1° C. and 156.3° C. as determined by differential thermal analysis.

A $^{13}$C-NMR analysis of the copolymer obtained was carried out by using deuteriochloroform as a solvent. As a result, the copolymer exhibited a signal assigned to the carbonyl group of polylactic acid at around 169.68 ppm and a signal assigned to the carbonyl group of polybutylene succinate at around 172.33 ppm, and a new signal caused by ester exchange was not observed.

However, as described below, the copolymer was assumed to have a considerably high block structure because the film prepared from the copolymer was transparent.

(2) Preparation of a film

The copolymer which was obtained by the reaction and had weight average molecular weight of 135,000 was pressed at 180° C. to prepare a film.

Properties of the film thus prepared are set fourth below. Transparency and heat resistance were measured after heat treatment at 120° C.

Thickness: 98–108 μm

Tensile strength: 340 kg/cm$^2$ (yield) 260 kg/cm$^2$ (break)

Elongation: 174%

Transparency (Haze): 6.0%

Heat resistance (120° C.): <5%

The film having a high mole fraction of polylactic acid was excellent in elongation, transparency and heat resistance as compared with the polylactic acid film prepared in Reference Example 1 below.

EXAMPLE 2

(1) Reaction

The reaction and post treatment were carried out by the same procedures as described in Example 1 (1) except that 57.6 g (0.80 mole) of poly-L-lactic acid having a weight average molecular weight of 137,000, 34.4 g (0.20 mole) of polybutylene succinate having a weight average molecular weight of 141,000 and 0.3 g of stannous oxide as a catalyst were used.

The copolymer thus obtained was 78.7 g (86% yield) and had an weight average molecular weight of 134,000.

The copolymer had two glass transition temperatures of 3.2° C. and 45.3° C., and two melting points of 106.0° C. and 155.3° C., respectively, as determined by differential thermal analysis.

(2) Preparation of a film

The copolymer which was obtained by the reaction and had an weight average molecular weight of 134,000 was pressed at 180° C. to prepare a film by the same procedures as carried out in Example 1 (2).

Properties of the film thus prepared are set forth below. Transparency and heat resistance were measured after heat treatment at 120° C.

Thickness: 111–113 μm

Tensile strength: 270 kg/cm$^2$ (yield) 280 kg/cm$^2$ (break)

Elongation: 350%

Transparency (Haze): 3.5%

Heat resistance (120° C.): <5%

The film having a high mole fraction of polylactic acid was excellent in elongation, transparency and heat resistance similar to the film prepared in Example 1 (2) which had a high mole fraction of polylactic acid.

EXAMPLE 3

(1) Reaction

The reaction and post treatment were carried out by the same procedures as described in Example 1 (1) except that 25.2 g (0.35 mole) of poly-L-lactic acid having a weight average molecular weight of 148,000, 28.5 g (0.17 mole) of polybutylene succinate having a weight average molecular weight of 141,000 and 0.27 g of tin powder as a catalyst were used.

The copolymer thus obtained was 42.7 g (80% yield) and had a weight average molecular weight of 132,000.

The copolymer had no glass transition temperature, and two melting points of 109.5° C. and 147.4° C. as determined by differential thermal analysis.

(2) Preparation of a film

The copolymer which was obtained by the reaction and had a weight average molecular weight of 132,000 was pressed at 180° C. to prepare a film by the same procedures as carried out in Example 1 (2).

Properties of the film thus prepared as set forth below. Transparency and heat resistance were measured after heat treatment at 120° C.

Thickness: 111–113 μm

Tensile strength: 67 kg/cm$^2$ (yield) 270 kg/cm$^2$ (break)

Elongation: 430%

Transparency (Haze): 8.0%

Heat resistance (120° C.): 100%

The film having a relatively high mole fraction of polybutylene succinate was similar in elongation transparency to and different in heat resistance from the film of Example 1 (2) having a low mole fraction of polybutylene succinate.

EXAMPLE 4

(1) Reaction

The reaction and post treatment were carried out by the same procedures as described in Example 1 (1) except that 13.0 g (0.18 mole) of poly-L-lactic acid having a weight average molecular weight of 137,000, 72.3 g (0.42 mole) of polybutylene succinate having a weight average molecular weight of 141,000 and 0.43 g of stannous oxide as a catalyst were used.

The copolymer thus obtained was 81.0 g (95% yield) and had a weight average molecular weight of 160,000.

The copolymer had a glass transition temperature of 28.9° C. and a melting point of 111.9° C. as determined by differential thermal analysis.

(2) Preparation of a film

The copolymer which was obtained by the reaction and had a weight average molecular weight of 160,000 was pressed at 170° C. to prepare a film by the same procedures as carried out in Example 1 (2).

Properties of the film thus prepared are set forth below. Transparency and heat resistance were measured after heat treatment at 120° C.

Thickness: 88–97 μm

Tensile strength: 270 kg/cm² (yield) 380 kg/cm² (break)

Elongation: 440%

Transparency (Haze): 26.0%

Heat resistance (120° C.): 100%

The film having a high mole fraction of polybutylene succinate was similar in elongation to and different in transparency and heat resistance from the film of Example 1 (2) having a high mole fraction of polylactic acid.

EXAMPLE 5

(1) Reaction

To a reaction vessel, 64.86 g (0.90 mole) of poly-L-lactic acid having a weight average molecular weight of 69,000, 11.42 g (0.10 mole) of polycaprolactone having a weight average molecular weight of 62,000, 0.42 g of tin powder and 333.9 g of diphenyl ether having water content of 10 ppm or less were charged. A tube was packed with 28 g of molecular sieve 3A and 69.6 g of diphenyl ether having water content of 10 ppm or less and mounted on the reaction vessel so as to return the solvent which was distilled by reflux to the reaction system after passing through the molecular sieve. The reaction was carried out at 150° C. with stirring for 28 hours under reduced pressure of 40 mmHg while protecting the reaction system from contamination by water.

The solvent after passing through the molecular sieve had a moisture content of 2 ppm.

To the reaction mixture, 800 ml of a 0.7% hydrochloric acid/isopropyl alcohol solution was added, stirred for an hour and filtered under suction. Such procedure was carried out twice to remove tin powder.

Filter cake was stirred in 600 ml of isopropyl alcohol and filtered under suction. Such procedure was repeated until the filtrate became neutral. Successively the filter cake was washed with hexane and air dried at 60° C. to obtain 39.52 g (52% yield) of the copolymer having a weight average molecular weight of 127,000.

The copolymer had two glass transition temperature of 23.1° C. and 35.3° C. and three melting points of 51.0° C., 61.1° C., and 155.1° C. as determined by differential thermal analysis.

(2) Preparation of a film

The copolymer which was obtained by the reaction and had a weight average molecular weight of 127,000 was pressed at 180° C. to prepare a film.

Properties of the film thus prepared are set forth below. Transparency and heat resistance were measured after heat treatment at 120° C.

Thickness: 197–218 μm

Tensile strength: 380 kg/cm² (yield) 220 kg/cm² (break)

Elongation: 290%

Transparency (Haze): 6.0%

Heat resistance (120° C.): <5%

The film having a high mole fraction of polylactic acid was excellent in a elongation, transparency and heat resistance as compared with the polylactic acid film prepared in Reference Example 1.

EXAMPLE 6

(1) Reaction

The same procedures as described in Example 5 (1) were carried out except that 57.6 g (0.80 mol) of poly-L-lactic acid having a weight average molecular weight of 69,000, 22.8 g (0.20 mole) of polycaprolactone having a weight average molecular weight of 62,000 and 0.29 g of tin powder were used, diphenyl ether was replaced by 68.4 g of o-dichlorobenzene, the reaction was carried out at 130° C. for 23 hours under reduced pressure of 200 mmHg, and post treatment was carried out by using 320 g of a 0.7% hydrochloric acid/methyl tert-butyl ether solution in place of a 0.7% hydrochloric acid/isopropyl alcohol solution. The copolymer thus obtained was 61.2 g (76% yield) and had a weight average molecular weight of 126,000.

The copolymer had two glass transition temperatures of −45.8° C. and 43.9° C., and three melting points of 51.0° C., 61.1° C., 159.8° C. as determined by differential thermal analysis.

(2) Preparation of a film

The copolymer which was obtained by the reaction and had a weight average molecular weight of 126,000 was pressed at 180° C. to prepare a film by the same procedures as carried out in Example 5 (2).

Properties of the film thus prepared are set forth below. Transparency and heat resistance were measured after heat treatment at 120° C.

Thickness: 150–169 μm

Tensile strength: 430 kg/cm² (yield) 320 kg/cm² (break)

Elongation: 250%

Transparency (Haze): 0.4%

Heat resistance (120° C.): <5%

The film having a high mole fraction of polylactic acid was excellent in a elongation, transparency and heat resistance similar to the film of Example 5(2) having a high mole fraction of polylactic acid.

EXAMPLE 7

(1) Reaction

Reaction, post treatment and recovery were carried out by the same procedures as described in Example 5 (1) except that 36.0 g (0.50 mole) of poly-L-lactic acid having a weight average molecular weight of 69,000, 57.0 g (0.50 mole) of polycaprolactone having a weight average molecular weight of 62,000, 0.18 g of tin powder as a catalyst, and 279.0 g of o-dichlorobenzene were used, and the reaction was carried out at 130° C. for 20 hours under reduced pressure of 200 mmHg. The copolymer thus obtained was 45.6 g (49% yield) and had a weight average molecular weight of 80,000.

The copolymer had two glass transition temperatures of −63.9° C. and −32.1° C. and had two melting points of 55.1° C. and 160.5° C. as determined by differential thermal analysis.

(2) Preparation of a film

The copolymer which was obtained by the reaction and had a weight average molecular weight of 80,000 was pressed at 180° C. to prepare a film.

Properties of the film thus prepared are set forth below. Transparency and heat resistance were measured after heat treatment at 120° C.

Thickness: 83–102 μm

Tensile strength: 230 kg/cm$^2$ (yield) 210 kg/cm$^2$ (break)

Elongation: 350%

Transparency (Haze): 8.0%

Heat resistance (120° C.): 100% <

The film having a high mole fraction of polycaprolactone was similar in elongation transparency to and different in heat resistance from the film of Example 5 (2) having a low mole fraction of polycaprolactone.

COMPARATIVE EXAMPLE 1

(1) Reaction

Reaction and post treatment were carried out by the same procedures as described in Example 1 (1) except that 28.8 g (0.40 mole) of poly-L-lactic acid having a weight average molecular weight of 119,000 and 17.2 g (0.10 mole) of polybutylene succinate having a weight average molecular weight of 141,000 were used in the absence of a catalyst.

Copolymer thus obtained was 44.0 g (96% yield) and had a weight average molecular weight of 147,000.

The copolymer had a glass transition temperature of 53.6° C. and two melting points of 111.5° C. and 162.7° C. as determined by differential thermal analysis.

(2) Preparation of a film

The copolymer which was obtained by the reaction and had a weight average molecular weight of 147,000 was pressed at 180° C. to prepare a film by the same procedures as carried out in Example 1 (2).

Properties of the film thus prepared are set forth below. Transparency and heat resistance were measured after heat treatment at 120° C.

Thickness: 111–113 μm

Tensile strength: 360 kg/cm$^2$ (yield) 300 kg/cm$^2$ (break)

Elongation: 37%

Transparency (Haze): 78.0%

Heat resistance (120° C.): <5%

The film prepared from the copolymer obtained from the reaction in the absence of a catalyst was excellent in heat resistance and inferior in elongation and transparency as compared with the film prepared from the copolymer obtained from the reaction in the presence of a catalyst.

COMPARATIVE EXAMPLE 2

(1) Reaction

In a reaction vessel, 36.0 g (0.36 mol) of 90% L-lactic acid and 5.3 g (0.04 mol) of 6-hydroxycaproic acid were heated at 150° C. for 3 hours with stirring under reduced pressure of 50 mmHg while distilling water out of the reaction system. The oligomer obtained was 30.8 g. After adding 0.158 g of tin powder to the oligomer, the reaction was continued for further 2 hours at 150° C. under reduced pressure of 30 mmHg. A Dean Stark trap was mounted on the reaction vessel, 0.743 g of tin powder and 102.5 g diphenyl ether were added, and an azeotropic dehydration reaction was carried out at 150° C. for an hour under reduced pressure of 35 mmHg while removing water. Thereafter, the Dean Stark trap was dismantled and a tube packed with 25 g of molecular sieve 3A and diphenyl ether having a water content of 10 ppm or less was provided so as to return again the distilled solvent to the reaction system after passing through the molecular sieve layer. Reaction was carried out at 130° C. for 35 hours with stirring under reduced pressure of 12 mmHg while protecting the reaction system from contamination by water.

The solvent after passing through the molecular sieve layer had water content of 2 ppm or less. To the reaction mixture, 220 g of chloroform was added and filtered under suction to remove tin powder.

The chloroform solution was washed with 100 ml of and 1N aqueous hydrochloric acid solution, successively washed twice with water and poured into 750 ml of methanol. Precipitated solid was filtered under suction, successively washed with methanol, then washed with hexane and dried at 30° C. under reduced pressure of 5 mmHg. The copolymer thus obtained was 25.0 g (80% yield) and had a weight average molecular weight of 115,000, and a glass transition temperature of 24.0° C. as determined by differential thermal analysis.

(2) Preparation of a film

The copolymer which was obtained by the reaction and had an weight average molecular weight of 115,000 was dissolved in chloroform and cast to obtain a film having dimensions of 150 mm×150 mm.

Properties of the film thus prepared are set forth below. Transparency and heat resistance were measured after heat treatment at 120° C.

Thickness: 68–72 μm

Tensile strength: 84 kg/cm$^2$ (yield) 340 kg/cm$^2$ (break)

Elongation: 480%

Transparency (Haze): 78.0%

Heat resistance (120° C.): 100% <

The film prepared from the random copolymer had high elongation, very poor heat resistance and poor transparency as compared with the film of Example 5 (2) which was prepared from the reaction product of homopolymers.

REFERENCE EXAMPLE 1

Polylactic Acid

A film was prepared from polylactic acid having a weight average molecular weight of 143,000 by the same procedures as carried out in Example 1 (2).

Properties of the film thus prepared are set forth below. Transparency and heat resistance were measured after heat treatment at 120° C.

Thickness: 88–97 μm

Tensile strength: 660 kg/cm$^2$ (break)

Elongation: 7%

Transparency (Haze): 33.3%

Heat resistance (120° C.): 100% <

The polylactic acid film obtained was inferior in elongation, transparency and heat resistance to the film prepared in Example 1 (2) from the copolymer having a high mole fraction of polylactic acid.

REFERENCE EXAMPLE 2

Polybutylene Succinate

A film was prepared from polybutylene succinate having a weight average molecular weight of 134,000 by the same procedures as carried out in Example 1 (2).

Properties of the film thus prepared are set forth below. Transparency and heat resistance were measured after heat treatment at 120° C.

Thickness: 88–97 μm

Tensile strength: 340 kg/cm$^2$ (yield) 330 kg/cm$^2$ (break)

Elongation: 330%

Transparency (Haze): 33.3%

Heat resistance (120° C.): 100% <

The polybutylene succinate film obtained was similar in elongation to and different in transparency and inferior heat resistance from the film of Example 1 (2) or Example 2 (2) which was prepared from the copolymer having high mole fraction of polylactic acid.

REFERENCE EXAMPLE 2

Polycaprolactone

A film was prepared from polycaprolactone having a weight average molecular weight of 111,000 by the same procedures as carried out in Example 5 (2).

Properties of the film thus prepared are set forth below. Transparency and heat resistance were measured after heat treatment at 120° C.

Thickness: 88–97 μm

Tensile strength: 150 kg/cm$^2$ (yield) 130 kg/cm$^2$ (break)

Elongation: 370%

Transparency (Haze): 33.0%

Heat resistance (120° C.): 100% <

The polycaprolactone film obtained was similar in elongation to and different in transparency heat resistance from the film of Example 7 (2) which was prepared from the copolymer having a high mole fraction of polycaprolactone.

Films prepared in Examples, Comparative Examples and Reference Examples were buried in compost and a degradation test in soil was carried out. After 30 days, all specimens were deteriorated and their strength could not be measured.

What is claimed is:

1. A process for preparing a degradable copolymer of aliphatic polyester comprising reacting two or more kinds of an aliphatic polyester homopolymer in the presence of a catalyst in a reaction mixture containing an organic solvent.

2. The process for preparing the degradable copolymer of aliphatic polyester according to claim 1 wherein a portion or most of the organic solvent is removed from the reaction mixture and an additional organic solvent which has water content less than or equal to water content of the removed organic solvent is charged to the reaction system.

3. The process for preparing the degradable copolymer of aliphatic polyester according to claim 2 wherein the organic solvent removed from the reaction mixture is dehydrated by coming into contact with a drying agent and is returned to the reaction system.

4. The process for preparing the degradable copolymer of aliphatic polyester according to claim 3 wherein the drying agent is a molecular sieve, an ion exchange resin, diphosphorus pentoxide or a metal hydride.

5. The process for preparing the degradable copolymer of aliphatic polyester according to claim 2 wherein the additional organic solvent has water content of 50 ppm or less.

6. The process for preparing the degradable copolymer of aliphatic polyester according to claim 1 wherein the organic solvent is an ether solvent.

7. The process for preparing the degradable copolymer of aliphatic polyester according to claim I wherein the two or more kinds of the aliphatic polyester homopolymer are a high molecular weight aliphatic polyester homopolymer having a weight average molecular weight of 10,000 or more and are selected from the group consisting of aliphatic polyester prepared from hydroxycarboxylic acid and aliphatic polyester prepared from diol and dicarboxylic acid.

8. The process for preparing the degradable copolymer of aliphatic polyester according to claim 7 wherein the two or more kinds of the aliphatic polyester homopolymer are polylactic acid and polybutylene succinate or polycaprolactone.

9. A degradable copolymer of aliphatic polyester obtained by the process according to claim 1.

10. The process for preparing the degradable copolymer of aliphatic polyester according to claim 1 wherein the organic solvent is a hydrocarbon solvent.

11. The process for preparing the degradable copolymer of aliphatic polyester according to claim 1 wherein the organic solvent is a halogenated solvent.

12. The process for preparing the degradable copolymer of aliphatic polyester according to claim 1 wherein the organic solvent is a ketone solvent.

13. The process for preparing the degradable copolymer of aliphatic polyester according to claim 1 wherein the organic solvent is a thio ether solvent.

14. The process for preparing the degradable copolymer of aliphatic polyester according to claim I wherein the organic solvent is a ester solvent.

* * * * *